(12) United States Patent
Zhang

(10) Patent No.: US 9,066,628 B2
(45) Date of Patent: Jun. 30, 2015

(54) GRINDER FACILITATING ADJUSTMENT OF GRINDING FINENESS

(75) Inventor: Guoping Zhang, Ningbo (CN)

(73) Assignee: Ningbo Garron Housewares Co., Ltd., Ningbo (CN)

(*) Notice: Subject to any disclaimer, the term of this patent is extended or adjusted under 35 U.S.C. 154(b) by 377 days.

(21) Appl. No.: 13/813,536

(22) PCT Filed: Jul. 21, 2011

(86) PCT No.: PCT/CN2011/001195
§ 371 (c)(1),
(2), (4) Date: May 15, 2013

(87) PCT Pub. No.: WO2012/009964
PCT Pub. Date: Jan. 26, 2012

(65) Prior Publication Data
US 2013/0221144 A1    Aug. 29, 2013

(30) Foreign Application Priority Data

Jul. 22, 2010   (CN) ...................... 2010 2 0270699 U

(51) Int. Cl.
*A47J 42/08* (2006.01)

(52) U.S. Cl.
CPC ...................... *A47J 42/08* (2013.01)

(58) Field of Classification Search
CPC .......................................... A47J 42/08
USPC ....................................... 241/169.1
See application file for complete search history.

(56) References Cited

U.S. PATENT DOCUMENTS 2,507,670 A * 5/1950 Jatkoe et al. ............... 241/169.1

* cited by examiner

*Primary Examiner* — Mark Rosenbaum
(74) *Attorney, Agent, or Firm* — Wang Law Firm, Inc.; Li K. Wang; Stephen Hsu

(57) ABSTRACT

The invention relates to a grinder with granularity adjusting mechanism, which comprises a container (1) for holding condiments and a grinding head assembly for grinding the condiments; wherein the grinding head assembly comprises a driving component (2), a female grinding head (3) and a male grinding head (4), the grinder further comprises the adjusting knob (5) that changes a gap between the male grinding head (4) and the female grinding head (3) by moving axially the male grinding head (4). As the design of the adjusting knob, it is convenient for the adjustment between the male grinding head and the female grinding head.

13 Claims, 7 Drawing Sheets

GRINDER FACILITATING ADJUSTMENT OF GRINDING FINENESS

RELATED APPLICATIONS

This application is a national phase entrance of and claims benefit to PCT Application for Grinder with Granularity Adjusting Mechanism, and the Application thereof, PCT/CN2011/001195, filed on Jul. 21, 2011, which claims benefit to Chinese Patent Application 201020270699.0, filed on Jul. 22, 2010. The specifications of both applications are incorporated here by this reference.

FIELD OF THE INVENTION

The present invention relates to the field of condiments grinders, in particular relates to a grinder with granularity adjusting mechanism.

DESCRIPTION OF THE PRIOR ART

Original structures of the condiments used by people in daily life are lumps or granules, such as Chinese prickly ash and star anise. Later people grinded the original condiments to power with industrialized machines to sell and use with the development of industrial technology. Compared with granule or lamp condiments, the powder condiments are more convenient to use and have a stronger flavor. However the powder condiments absorb moisture easily, are difficult to store and are easy to loss flavor and have short shelf lives. The way to solve such problems is to grind the original condiments to powders at the use site in real time.

Grinders are used to grind the condiments at the use site in daily life, the existing grinders comprise two types of manual operation and motor-driven. A grinder usually comprises a container for placing the original condiments and a grinding head assembly connected with said container for grinding the original condiments. Wherein the grinding head assembly usually comprises a male grinding head and a female grinding head; said female grinding head is a ring structure with a through hole in the center part, and the surrounding wall of the through hole are uneven to form the male grinding teeth; said male grinding head is installed in said through hole rotatable relative to the female grinding head and a gap is provided between the male grinding head and the female grinding head, the gap is a passage for grinding and discharge the condiments; the peripheral wall of said female grinding head are also uneven so as to form female grinding teeth matching with the male grinding teeth on said male grinding head.

In order to grind condiments in different shapes simultaneously and meet the demands of people for different grinding granularity, usually the gap between the male grinding head and the female grinding head is designed to be adjustable so as to obtain different grinding granularity via changing the gap between the two. The specific structure is as follows: said grinding head assembly further comprises a driving component, the driving component passes through the through hole on the male grinding head and rotates relative to the female grinding head, said male grinding head is installed on said driving rod and can move relative to the length direction of the driving rod, said gap can be adjusted by changing the relative position of the male grinding head and the driving rod, the grinder is convenient for use. For an electronic grinder, the driving component is driven by the drive mechanism of the electronic grinder; for a manual grinder, the driving component is driven by the user manually.

However, adjustment between the female grinding head and the driving rod of the existing grinder needs manual operation of the user, the male grinding head and female grinding head will be contacted directly, which is very unhealthful; simultaneously, as the household grinders are usually small, the two grinding heads are also small, so the manual adjustment are quite inconvenient.

SUMMARY OF THE INVENTION

It is an object of the present invention to provide a grinder which is benefit for health and is convenient to adjust the grinding granularity.

For achieving the above stated object, a grinder with granularity adjusting mechanism, comprises a container for holding condiments and a grinding head assembly connected to the container for grinding the condiments; wherein the grinding head assembly comprises: a driving component mounted on top of the container, the driving component having an axis; a female grinding head rotatably mounted on the driving component, the female grinding head having a first through hole, the driving component passing through the first through hole, the first through hole defining an inner wall; a male grinding head placed inside the first through hole 1 and engaged to the driving component and movable along the axis of the driving component, the male grinding head having a peripheral wall; and the inner wall of the first through hole and the peripheral wall of the male grinding head are provided with matching grinding teeth;

wherein, an adjusting knob, with a connecting portion, engaged to the driving component, the connecting portion having a height, the adjusting knob changes a gap between the male grinding head and the female grinding head by moving axially the male grinding head.

Preferably, the driving component, the male grinding head, the female grinding head are installed in a housing, the housing having a rotatable detachable cover the cover engages the connecting portion of the adjusting knob.

Preferably, the cover has a bottom surface and a protrusion on the bottom surface, the protrusion has a recess for receiving the connecting portion, the recess has a depth greater than the height of the connecting portion of the adjusting knob. It can ensure that the cover is always contacted with the housing to form a relatively sealed connection so as to ensure the grinded condiments will not leak from the gap between the cover and the housing.

Preferably, the recess and the connecting portion have a matching profile. The structure is simple and is convenient for the cooperation and transmitting between the cover and the adjusting knob.

In the above-mentioned solution, when discharging the condiments after grinding, the cover needs to be taken down from the adjusting knob. In order to make the discharging more convenient, preferably, the cover further comprises a discharge port and a sliding closure movably mounted on the cover, the sliding closure removably covers the discharge port.

In all the above-mentioned solutions, the structure to make the adjusting knob adjust the male grinding head can be any of the existing an, preferably, the driving component further comprises a connecting seat and a connecting rod mounted on the connecting seat, the male grinding head defining a second through hole adapted for the connecting rod passing through, the second through hold is threaded for connecting to the adjusting knob, and a spring is provided between the male grinding head and the connecting seat for pushing the male grinding head away from the connecting seat Preferably, the connecting seat is rotatably connected to the housing, the connecting seat is mounted on the container, and the connecting seat having a passage for the condiments to enter into the gap.

For achieving the above stated object, another solution is as follows: a grinder, with granularity adjusting capability, comprises a grinding head assembly with a grinding gap, a cover covering the a grinding head assembly, and an adjusting knob with a connecting portion mounted on the grinding head assembly; wherein the cover has a center with a protrusion, formed with a polygon columnar recess, extending toward the grinding head assembly for receiving said connecting portion, and the cover has a discharge port and a sliding closure and the sliding closure covers the discharge port slidingly. The adjusting knob adjusts the grinding gap, and the connecting portion moves vertically inside the recess.

Preferably, the sliding closure has an outlet for outputting grinded material.

Preferably, said cover has a circular positioning edge, the grinding head assembly has an upper edge with an inner wall, and the cover is rotatably and detachably mounted on the upper edge of the grinding head assembly, the positioning edge matches with the inner wall of the upper edge.

Preferably, said grinding head assembly further comprises a lower fastener ring and an upper housing ring mounted on the lower fastener ring; the lower fastener ring has a connecting seat, the upper housing ring has a lining inside the upper housing ring and a medium piece for holding the grinding head assembly.

Preferably, the grinding head assembly comprise a female grinding head with a grinding chamber and a male grinding head inserted partially into the grinding chamber, the male grinding head being able to rotate relative to the female grinding head; the grinding chamber has female grinding teeth, the male grinding head has a peripheral surface with male grinding teeth.

Preferably, said connecting seat has a connecting rod, the male grinding head defining a second through hole for receiving the connecting rod, the connecting rod passes through the second through hole.

Preferably, a pressure buffer spring is mounted on the connecting rod and under the male grinding head, the female grinding head is placed inside the medium piece, the adjusting knob is threaded for connecting to the connecting rod.

Preferably, further comprising a glass bottle for containing edible grain substances attached to the connecting seat.

Compared with the prior art, in the present invention, under the design of the adjusting knob, it is convenient for the adjustment between the male grinding head and the female grinding head and it simultaneously ensures a sanitary grinding process; it further brings convenience to grind and discharge due to the design of the discharge port on the cover and sliding closure.

DETAILED DESCRIPTION OF THE PREFERRED EMBODIMENT

Figure 1:
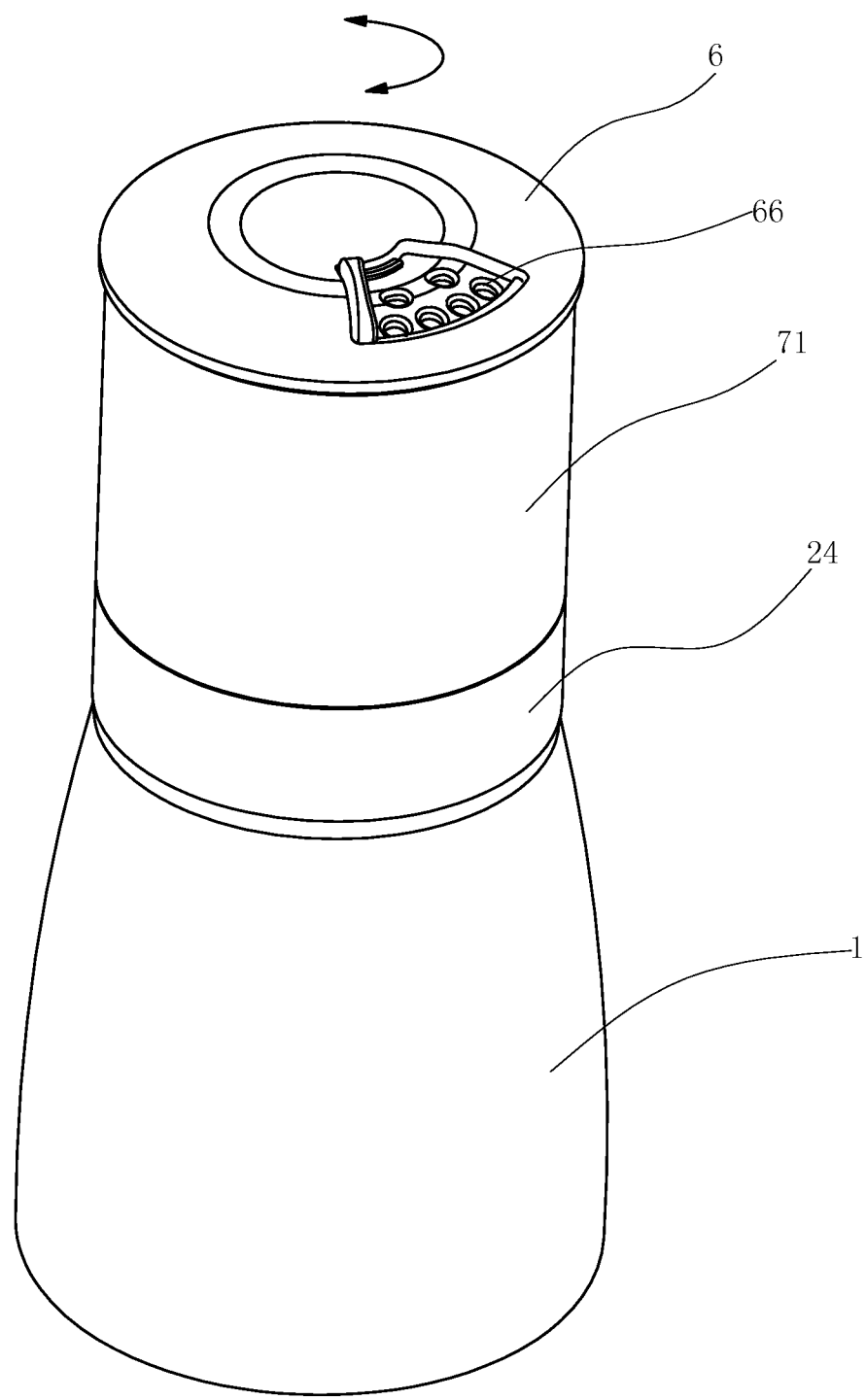
FIG. 1 is a perspective view of a grinder in accordance with an embodiment of the present invention when the discharge port is open.
Figure 2:
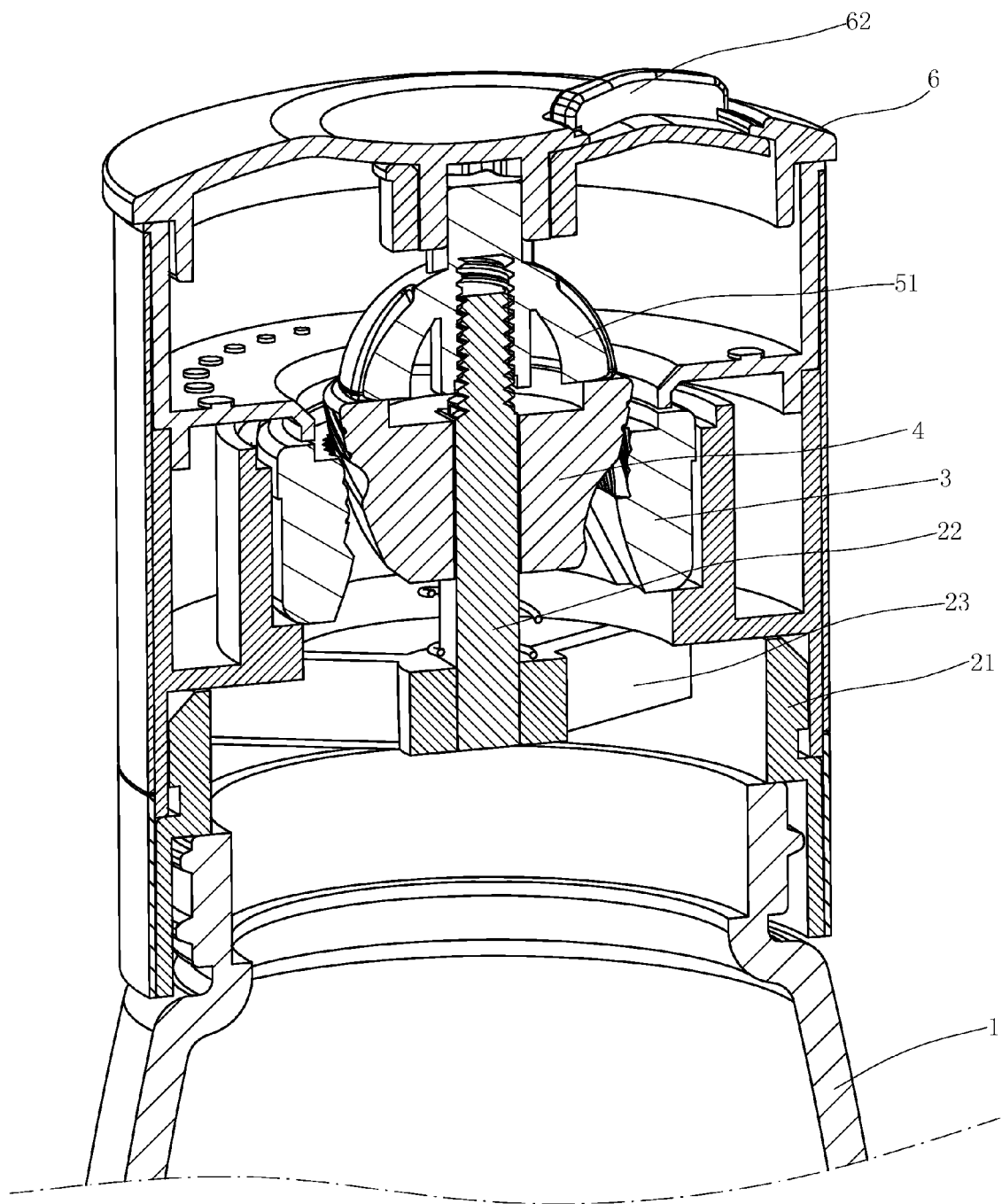
FIG. 2 is a perspective sectional view of the grinder in accordance with the embodiment of the present invention.
Figure 3:
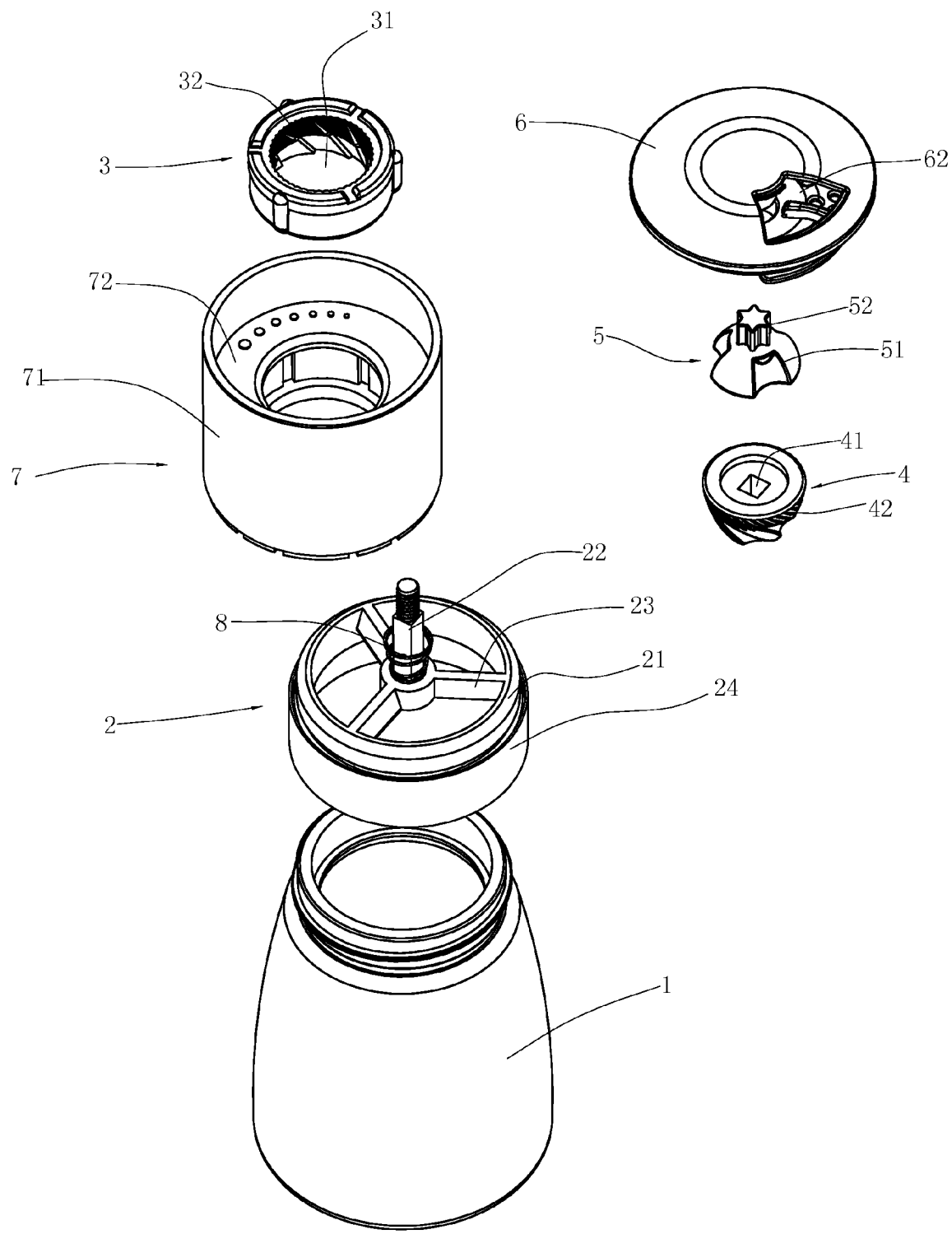
FIG. 3 is an exploded view of the grinder in accordance with the embodiment of the present invention.
Figure 4:
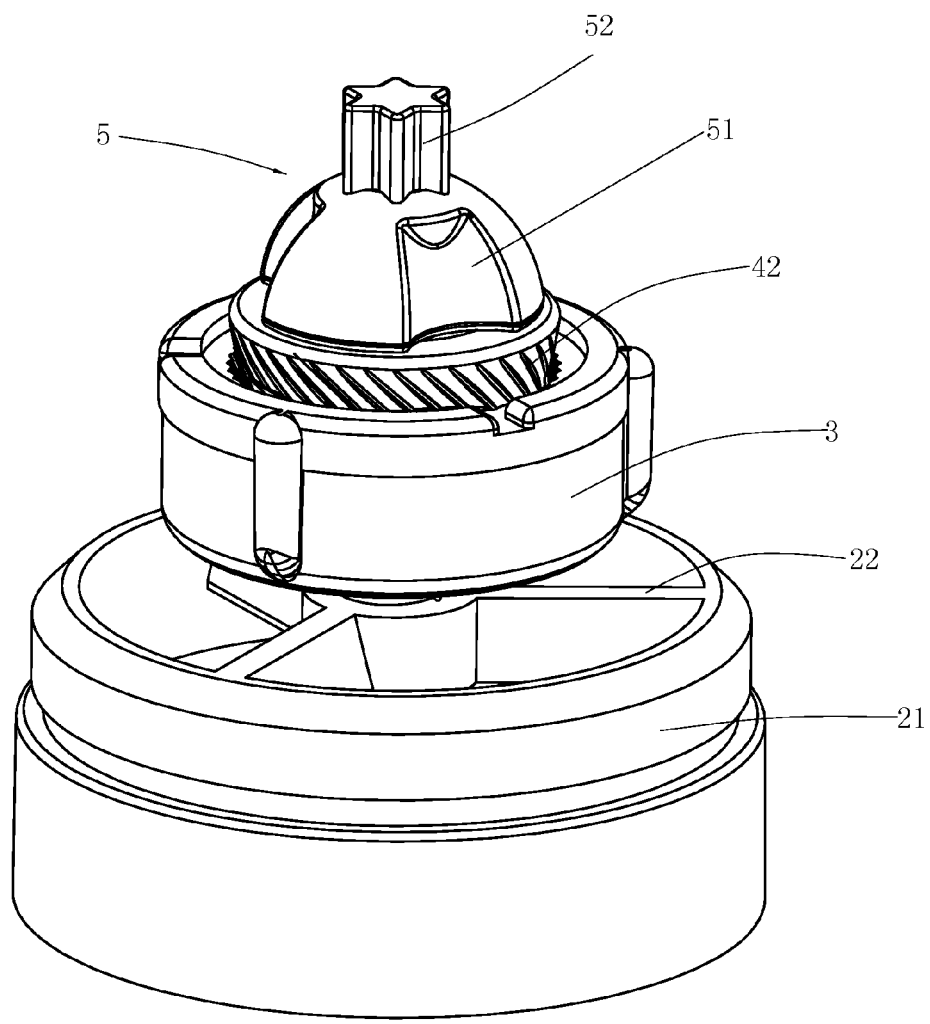
FIG. 4 is a perspective view of the grinding head assembly in accordance with the embodiment of the present invention.
Figure 5:
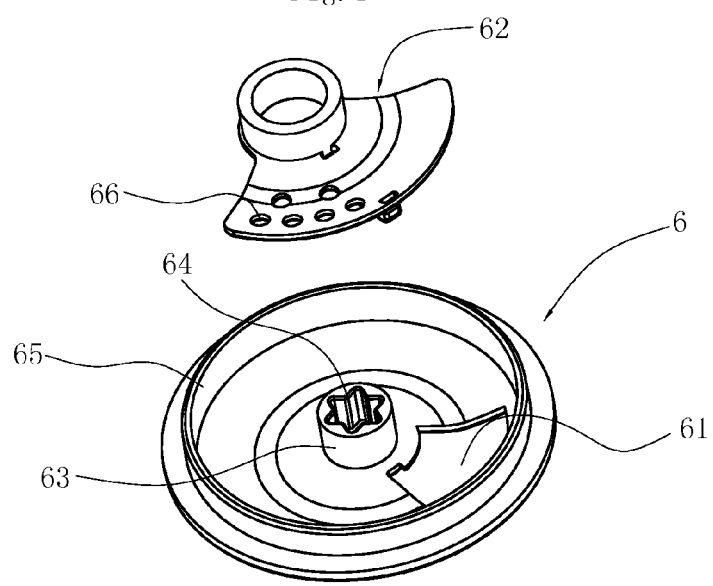
FIG. 5 is an exploded view of the cover in accordance with the embodiment of the present invention.
Figure 6:
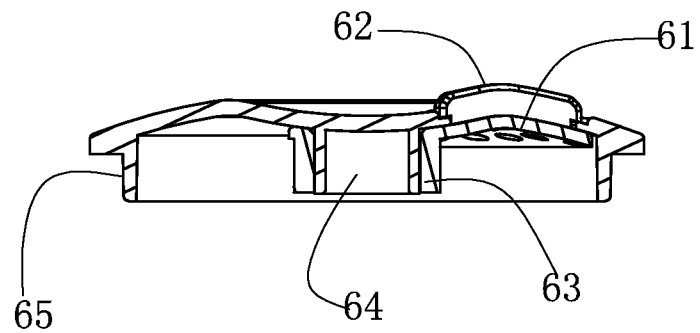
FIG. 6 is a sectional view of the cover in accordance with the embodiment of the present invention.
Figure 7:
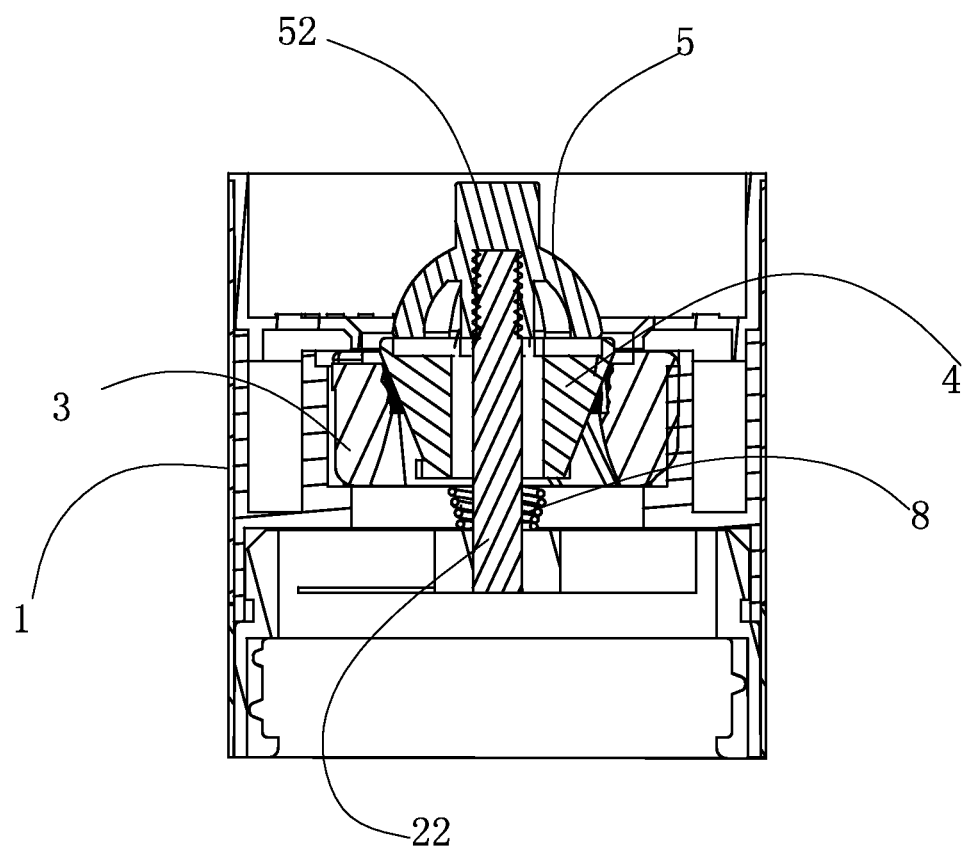
FIG. 7 is a sectional view of the grinding head assembly in accordance with the embodiment of the present invention.
Figure 8:
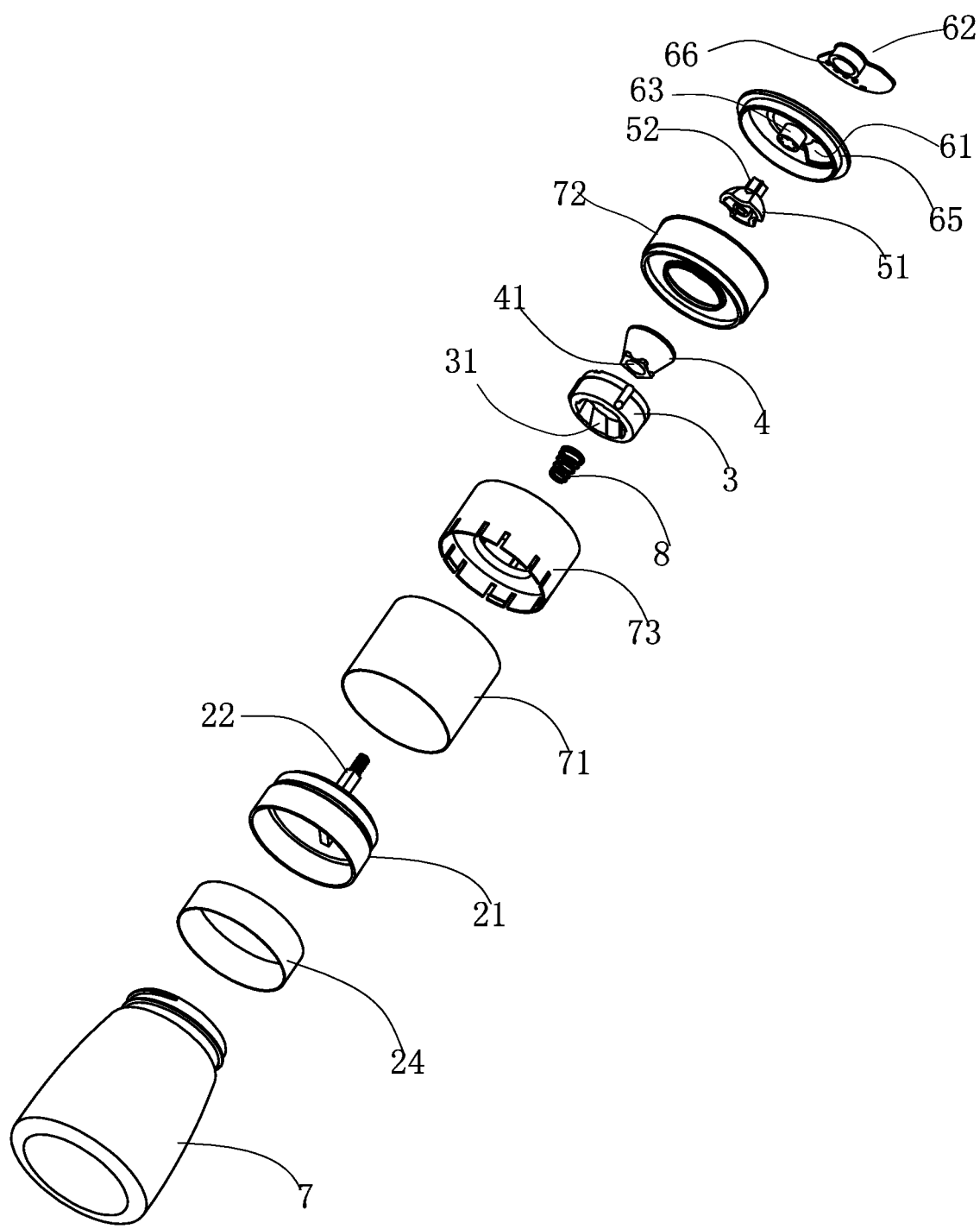
FIG. 8 is another exploded view of the grinder in accordance with the embodiment of the present invention.
Figure 9:
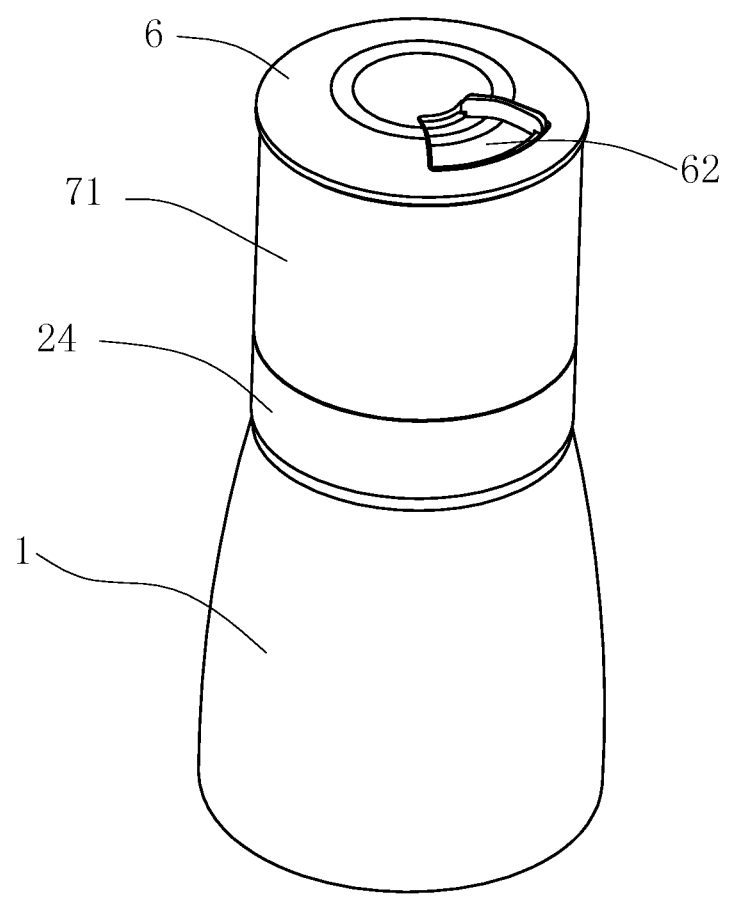
FIG. 9 is a perspective view of the grinder in accordance with the embodiment of the present invention when the discharge port is close.

To enable a further understanding of the innovative and technological content of the invention herein, refer to the detailed description of the invention and the accompanying drawings below:

The embodiment takes a manual grinding bottle as an example to explain the grinder with granularity adjusting mechanism. As shown in FIGS. 1~9, the grinder with granularity adjusting mechanism comprises a container 1, a driving component 2, a housing 7, a female grinding head 3, a male grinding head 4, an adjusting knob 5, a cover 6.

The container 1 is for holding condiments, in the embodiment, the container 1 is a glass bottle, the bottle neck is provided with external threads.

The driving component 2 comprises a connecting seat 21 and a connecting rod 22, wherein, the connecting seat 21 mounted on a lower fastener ring 24 is threaded connected with the container 1; the connecting rod 22 is connected to the connecting seat 21 by three strips 23 formed on the connecting rod 22 at intervals, the connecting seat 21 and the strips can be in a whole component, the periphery of the top of the connecting rod 22 is provided with threads.

The housing 7 comprises an upper housing ring 71, a medium piece 72 and a lining 73, wherein the upper housing ring 71 has a medium piece 72 for containing a female grinding head 3 and a lining 73 stuck on the medium piece 72 with glues for positioning and storing below stated grinding head assembly, is sleeved with a medium piece 72 and a lining 73, is rotatably connected to the connecting seat 21.

The female grinding head 3 is in ring-shaped and is installed in the housing 7 and engages the housing 7, the female grinding head 3 comprises a first through hole 31, the inner wall of the first through hole 31 comprises female grinding teeth 32, in the embodiment, the first through hole 31 is a taper structure which enables charge and discharge to be unhindered and simultaneously ensures the stop of the condiments in the gap while grinding.

The male grinding head 4 is installed in the first through hole 31 of the female grinding head 3, a second through hole 41 is provided on the male grinding head 4, the peripheral wall thereof is provided with male grinding teeth 42 matching with the female grinding teeth 32; a gap, which is provided between the female grinding teeth. 32 and the male grinding teeth 42, is a passage for grinding and discharging; the connecting rod 22 passes through the second through hole 41 exposed out of the male grinding head 4, a gap is formed between the connecting rod 22 and the second through hole 41; a spring 8 is sleeved on the connecting rod 22 and is resisted between the connecting seat 21 and the male grinding head 4.

The driving component 2, female grinding head 3 and male grinding head 4 form the above said grinding head assembly of the embodiment.

The adjusting knob 5 that comprises a base 51 and a connecting portion 52; the base 51 is threaded for connecting to the threads of the connecting rod 22; the cross section of the connecting portion 52 appears to be polygon structure.

The cover 6 is rotatably covered on the housing 7 so as to seal the grinding head assembly in the chamber formed by the housing 7 and cover 6 to ensure the health. In order to bring convenience for discharging, the cover 6 has a discharge port 61 and a sliding closure 62 and the sliding closure 62 covers the discharge port 61 slidingly, in order to enable the grinded condiments to scatter evenly, the sliding closure has an outlet for outputting grinded material, the quantity of the discharge holes 66 can be set according to demands, the discharge hole 66 can be open or close by rotating the sliding closure 62, the cover 6 has a circular positioning edge 65 that matches with the inner wall of the housing 7, the cover 6 reserves all functions of the traditional cover and can be taken down to clean conveniently to remove the residuals, the cover 6 has protrusion 63 on the bottom surface, the protrusion 63 has a polygon columnar recess 64 for receiving the connecting portion 52 of the adjusting knob 5.

The adjusting knob 5 can be unscrewed or screwed by rotating the cover 6, so as to adjust the grinding gap of the grinding component 6 and control the grinding granularity of the condiments. When grinding, the cover 6 does not need to be taken down, the discharge and flux of the condiments can be controlled by sliding the sliding closure 62, it can ensure the use health and prevent secondary pollution.

For the manual grinder of the embodiment, the housing 7 is manually rotated to drive the female grinding head 3 in the housing 7, so as to enable relative movements between the female grinding head 3 and the male grinding head 4 and then to grind the condiments in the gap between the male grinding head 4 and the female grinding head 3.

For an electronic grinder, the connecting rod 22 or housing 7 is driven to rotate by an electric-driving drive mechanism.

The invention claimed is:

1. A grinder with granularity adjusting mechanism, comprising a container for holding condiments and a grinding head assembly connected to the container for grinding the condiments;
   wherein the grinding head assembly comprises:
   a driving component mounted on top of the container, the driving component having an axis;
   a female grinding head rotatably mounted on the driving component, the female grinding head having a first through hole, the driving component passing through the first through hole, the first through hole defining an inner wall;
   a male grinding head placed inside the first through hole and engaged to the driving component and movable along the axis of the driving component, the male grinding head having a peripheral wall;
   an adjusting knob, with a connecting portion, engaged to the driving component, the connecting portion having a height,
   the inner wall of the first through hole and the peripheral wall of the male grinding head are provided with matching grinding teeth,
   the adjusting knob changes a gap between the male grinding head and the female grinding head by moving axially the male grinding head, and
   the driving component further comprises a connecting seat and a connecting rod mounted on the connecting seat, the male grinding head defining a second through hole adapted for the connecting rod passing through, the second through hole is threaded for connecting to the adjusting knob, and a spring is provided between the male grinding head and the connecting seat for pushing the male grinding head away from the connecting seat.

2. The grinder of claim 1, wherein the driving component, the male grinding head, the female grinding head are installed in a housing, the housing having a rotatable detachable cover the cover engages the connecting portion of the adjusting knob.

3. The grinder of claim 2, wherein the cover has a bottom surface and a protrusion on the bottom surface, the protrusion has a recess for receiving the connecting portion, the recess has a depth greater than the height of the connecting portion of the adjusting knob.

4. The grinder of claim 3, wherein the recess and the connecting portion have a matching profile.

5. The grinder of claim 4, wherein the cover further comprising a discharge port and a sliding closure movably mounted on the cover, the sliding closure removably covers the discharge port.

6. The grinder of claim 1, wherein the connecting seat is rotatably connected to the housing, the connecting seat is mounted on the container, and the connecting seat having a passage for the condiments to enter into the gap.

7. A grinder, with granularity adjusting capability, comprising a grinding head assembly with a grinding gap, a cover covering the a grinding head assembly, and an adjusting knob with a connecting portion mounted on the grinding head assembly;
   wherein
   the cover has a center with a protrusion, formed with a polygon columnar recess, extending toward the grinding head assembly for receiving said connecting portion, and the cover has a discharge port and a sliding closure and the sliding closure covers the discharge port slidingly;
   the adjusting knob adjusts the grinding gap, and the connecting portion moves vertically inside the recess, and
   said grinding head assembly further comprises a lower fastener ring and an upper housing ring mounted on the lower fastener ring; the lower fastener ring has a connecting seat, the upper housing ring has a lining inside the upper housing ring and a medium piece for holding the grinding head assembly.

8. The grinder of claim 7, wherein the sliding closure has an outlet for outputting grinded material.

9. The grinder of claim 8, wherein said cover has a circular positioning edge, the grinding head assembly has an upper edge with an inner wall, and the cover is rotatably and detachably mounted on the upper edge of the grinding head assembly, the positioning edge matches with the inner wall of the upper edge.

10. The grinder of claim 7, wherein the grinding head assembly comprise a female grinding head with a grinding chamber and a male grinding head inserted partially into the grinding chamber, the male grinding head being able to rotate relative to the female grinding head; the grinding chamber has female grinding teeth, the male grinding head has a peripheral surface with male grinding teeth.

11. The grinder of claim 10, wherein said connecting seat has a connecting rod, the male grinding head defining a second through hole for receiving the connecting rod, the connecting rod passes through the second through hole.

12. The grinder of claim 11, wherein a pressure buffer spring is mounted on the connecting rod and under the male grinding head, the female grinding head is placed inside the medium piece, the adjusting knob is threaded for connecting to the connecting rod.

13. The grinder of claim 12, further comprising a glass bottle for containing edible grain substances attached to the connecting seat.

* * * * *